Feb. 6, 1951        J. C. POPE ET AL        2,540,214
DRIVER'S COMPARTMENT FOR TRUCK BODIES
Filed Feb. 24, 1948                         2 Sheets-Sheet 1

Inventors,
Jesse C. Pope
H. S. Tillinghast
By Mason, Fenwick & Lawrence
Attorneys

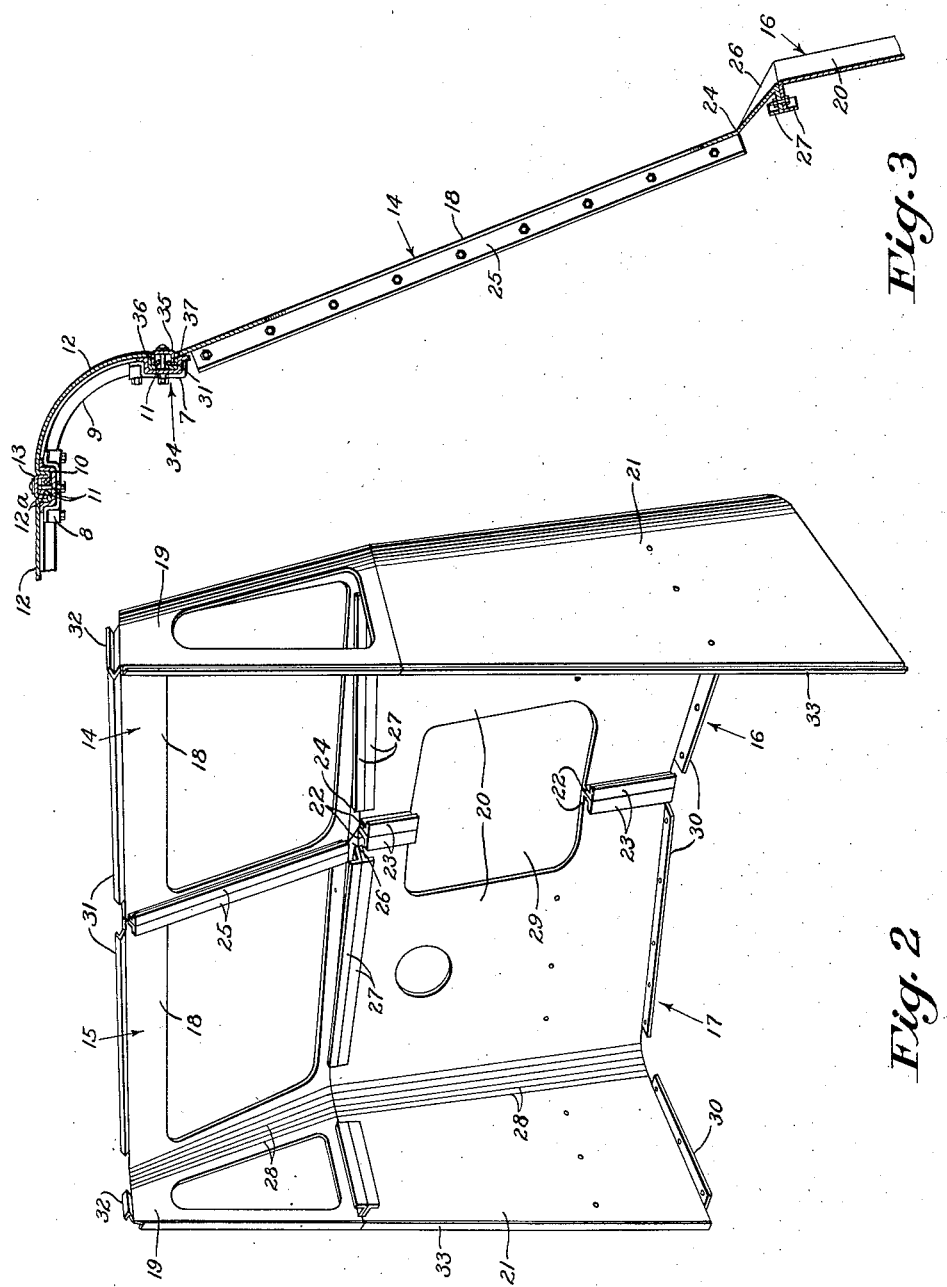

Patented Feb. 6, 1951

2,540,214

UNITED STATES PATENT OFFICE 2,540,214

DRIVER'S COMPARTMENT FOR TRUCK BODIES

Jesse C. Pope and Harry S. Tillinghast, Atlanta, Ga., assignors to Armor Insulating Company, Atlanta, Ga.

Application February 24, 1948, Serial No. 10,364

4 Claims. (Cl. 296—28)

This invention relates to floor and cab construction particularly designed as completion units for the known "Lindsay" system of fabricating truck bodies, features of which system are covered by U. S. Patents Nos. 2,017,629, 2,263,510 and 2,263,511.

The "Lindsay" structure comprises vertical and horizontal frame members sized for length at the factory, shipped to the body builder knocked down, and adapted to be secured together in rectangular relationship, suitable fittings being furnished for this purpose, to form a framework of rectangular panel spaces adapted to be covered by sheet metal panels, which panels are also furnished as part of the knocked down equipment. The "Lindsay" framework is characterized by the absence of diagonal struts, being of monocoque construction, that is, relying upon the sheet metal cover panels for rigidity, and with this end in view, tensioning members are provided coinciding with such of the frame members as are congruent with the margins of the cover panels for forcibly drawing down the edges of the cover panels, thereby maintaining the entire surface thereof under tension, so that they are kept absolutely planiform and rigid.

One of the objects of the present invention is to provide a cab construction adapted to be distributed to truck body builders in knocked down form as a complement to the known "Lindsay" construction.

Another object of the invention is to provide a cab construction adapted to be secured to the "Lindsay" framework by the tensioners normally employed in the "Lindsay" construction.

Still another object of the invention is the provision of novel cab constructions adapted for general application to truck bodies and like structures independently of its contemplated association with the "Lindsay" construction.

Other objects of the invention will appear as the following description of a preferred and practical embodiment thereof proceeds.

In the drawing which accompanies and forms a part of the following specification:

Figure 2 is a perspective view of the assembled cab, viewed from the rear; and

Figure 3 is a section taken along the line 4—4 of Figure 1.

Figure 1:
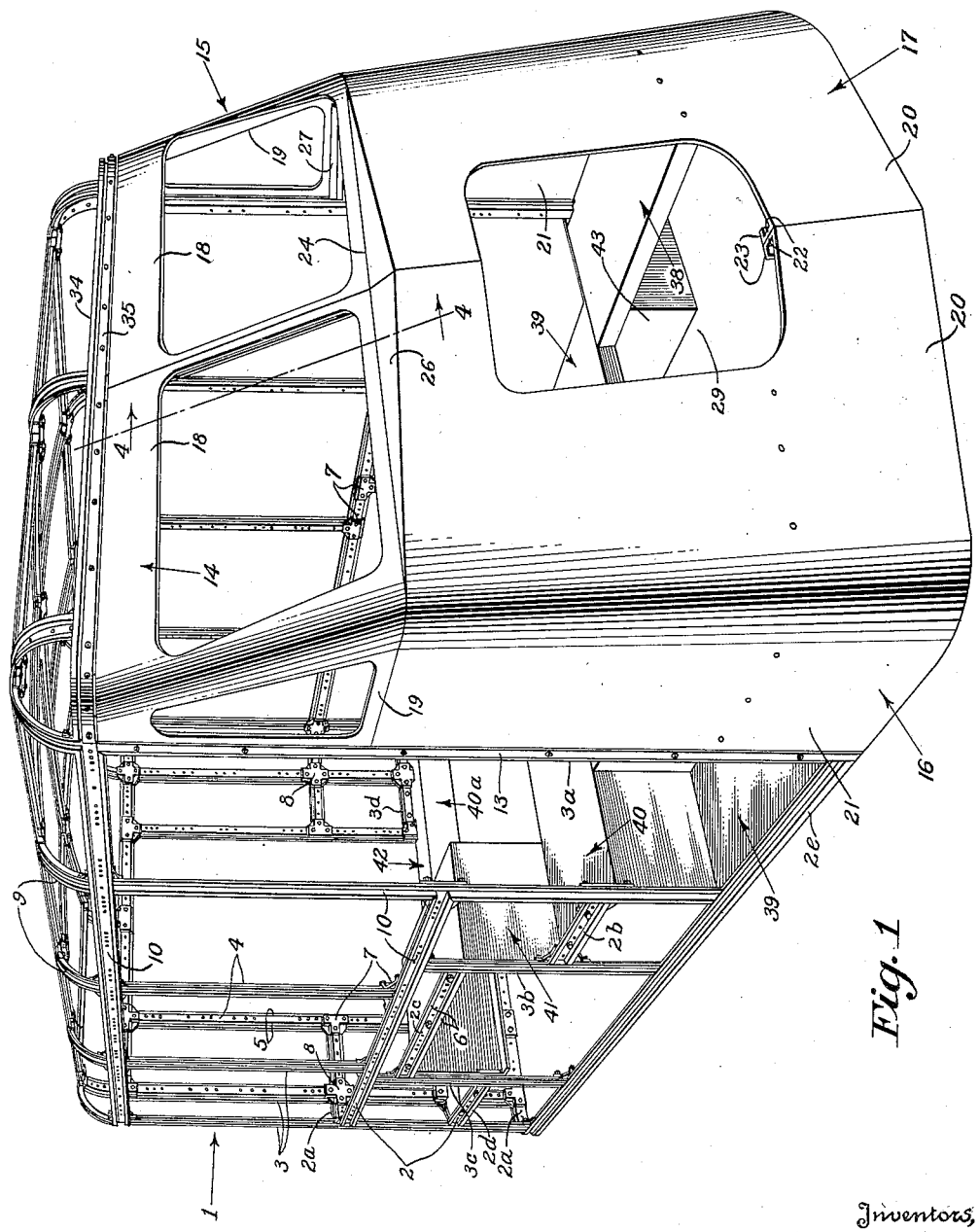
Figure 1 is a perspective view of a truck body embodying the "Lindsay" framework, the cover panels being omitted, showing the floor and cab construction of the present invention in its relation to said framework.

Referring now in detail to the several figures, the known framework is generally indicated by the reference character 1. It comprises a plurality of horizontal frame members 2 and vertical frame members 3. Said frame members are each in the form of a channel having a flat web 4, side flanges 5 and outwardly turned marginal flanges 6, lying in a common plane. At points where frame members meet or intersect, they are connected by fittings 7 or 8, having openings spaced at 90° angles to receive the adjacent ends of the frame members. The roof is similarly constructed and may be joined to the vertical framework by arcuate cove members 9. The frame members are arranged with the valleys 10 of the channels facing outwardly, the function of the valleys being to provide spaces into which to sink the dihedral marginal flanges 11 of the sheet metal cover panels 12, which are engaged by the flanges 12a of the tensioners 13, the latter being of such width as to enter the valleys 10 when the tensioners are bolted down upon the frame members, with clamping pressure against the flanges 11 of the cover panels 12.

In the specific framework shown in Figure 1, the side and rear ends are joined by the arcuate channel shaped horizontal frame members 2a, the front vertical frame members 3a being continuous throughout their length.

The foregoing is a general description of the known structure with which the cab construction of the present invention cooperates to form a complete truck body.

Referring now to the cab structure shown in Figures 1, 2 and 3, this is fabricated from an upper pair of similar right and left windshield panels 14 and 15, and a pair of similar right and left lower panels 16 and 17. The upper panels are each bent to form a front face 18 and a side wing 19, each having a window opening. The lower panels are likewise bent to form respective front and side portions 20 and 21.

The front portions 20 of the lower panels meet in the medial vertical longitudinal plane of the truck body at a wide angle, the adjacent ends of said panels being formed with rearwardly extended flanges 22, which abut and are bolted together. Said flanges are stiffened through the provision of oppositely directed marginal flanges 23.

The front faces 18 of the upper panels lie in a common plane down to the line 24, and are likewise secured together at their adjacent ends in the median longitudinal vertical plane of the body by means of end flanges 25, bolted together similarly to the flanges 22. The lower parts of the front face 18 are bent outwardly along the line 24, to provide a sloping cowl 26, which meets the angularly disposed upper ends of the front portions of the lower panels. The meeting ends of the cowl 26 and lower front portions 20 are formed with abutting back turned flanges 27, bolted together, and the meeting ends of the side wings 19 and the lower side portions 21 are similarly flanged and secured. The securing flanges are discontinued over the curvilinear portions of both the upper and lower panels.

The cab panels are shipped separate, and if desired, in flat condition, in which case they may be formed with weakened break lines 28 on the surfaces which are to assume curvilinear form, so that they can be bent to a predetermined curvilinear contour at the place of assemblage.

The front portions 20 of the lower panels 16 and 17 are formed with matching indents in their meeting ends which together form an opening 29 to be covered by a grill. The lower ends of the cab panels are turned inward, forming stiffening flanges 30.

The cab structure, along its top edge and vertical rear edges, is provided with inwardly directed dihedral flanges 31, 32 and 33. When the cab is in place, these register respectively with channels in the foremost vertical members 3a, and the front horizontal roof member 34. Tensioners 35 have spaced flanges 36 and 37 engageable respectively with the apices of the dihedral flanges of the cab structure and the apices of the dihedral flanges of the adjacent cover panels 12, and draw them down into the respective channel members with which they register when the tensioners are tightly bolted to said channel members. Thus a neat, secure and weather tight joint is produced between the "Lindsay" structure and the cab of the present invention.

While the cab construction, as above described, is particularly designed to be shipped knocked down into its individual panel units, and to be furnished to body builders who purchase the "Lindsay" body units knocked down, as a complement to the "Lindsay" structure in the building of complete truck bodies, it will be readily appreciated that both the cab and floor construction are not necessarily restricted to use with any particular type of structure, but are of general application to any type of body framework to which they are adapted to be fitted.

It will be understood by those skilled in the art that the specific details of construction and arrangement of parts, as shown and described, are by way of example and not to be construed as limiting the scope of the invention.

What we claim as our invention is:

1. Sheet metal cab construction comprising upper and lower wall portions joined in a transverse seam and bent to form front and side walls, the rear edges of said side walls terminating in a transverse vertical plane, the front of said upper portion being convergent toward said plane, the rear edges of said side walls and the top edges of said side and front walls terminating in flanges of trough-shaped cross-section forming seats for linear clamping elements, for securing said flanges to correspondingly positioned members of a body framework.

2. Sheet metal cab construction comprising upper and lower wall portions meeting in a transverse plane, said portions comprising respectively a pair of right and left upper panels and a pair of right and left lower panels, bent to form front faces and side walls, the front faces of the panels of each portion meeting in the medial vertical plane of the cab, the meeting edges of said panels both in said vertical and transverse planes being provided with back turned flanges, corresponding flanges being in abutment and bolted together, the front face of said lower panels converging forwardly at a wide angle, the upper parts of the front faces of said upper panels lying in a common plane, and the lower parts of said upper faces being forwardly directed from a common straight transverse line, forming a cowl which meets the upper end of the lower panels, said side walls, at both sides, terminating in a vertical transverse plane, the rear edges of said side walls and the top edge of said upper wall portion terminating in flanges of trough-shaped cross-section forming seats for linear clamping elements, for securing said flanges to correspondingly positioned members of a body framework.

3. In combination with a truck body framework, the foremost members of which consist essentially of channel shaped vertical side members and channel shaped horizontal top members, with the troughs of the channels facing outwardly, and linear tensioners fitting within the troughs of said channels adapted to be bolted to said channel members and to draw down in clamped relation the peripheral flanges of sheet cover panels of said truck body, a sheet metal cab construction comprising upper and lower wall portions joined in a transverse seam and bent to form front and side walls, the rear edges of said side walls terminating in a transverse vertical plane, the front of said upper portion being convergent toward said plane, the rear edges of said side walls and the top edges of said side and front walls terminating in flanges of trough-shaped cross-section forming seats to be engaged by said tensioners for securing said flanges to correspondingly positioned of said framework members.

4. In combination with a truck body framework, the foremost members of which consist essentially of channel-shaped vertical side members and channel-shaped horizontal top members, with the troughs of the channels facing outwardly, and linear tensioners fitting within the troughs of said channel members adapted to be bolted to said channel members and to draw down in clamped relation the peripheral flanges of sheet cover panels of said truck body, a sheet metal cab construction comprising upper and lower wall portions meeting in a transverse plane, said portions comprising respectively a pair of right and left upper panels and a pair of right and left lower panels, bent to form front faces and side walls, the front faces of the panels of each portion meeting in the medial vertical plane of the cab, the meeting edges of said panels both in said vertical and transverse planes being provided with back turned flanges, corresponding flanges being in abutment and bolted together, the front face of said lower panels converging forwardly at a wide angle, the upper parts of the front faces of said upper panels lying in a common plane, and the lower parts of said upper faces being forwardly directed from a common straight transverse line, forming a cowl which meets the upper end of the lower panels, said side walls, at both sides, terminating in a vertical transverse plane, the rear edges of said side walls and the top edge of said upper wall portion terminating in flanges of trough-shaped cross-section forming seats to be engaged by said tensioners for securing said flanges to correspondingly positioned of said framework members.

JESSE C. POPE.
    HARRY S. TILLINGHAST.

REFERENCES CITED

The following references are of record in the file of this patent:

UNITED STATES PATENTS

| Number | Name | Date |
|---|---|---|
| 1,689,765 | Baxter | Oct. 30, 1928 |
| 1,852,464 | Leipert | Apr. 5, 1932 |
| 2,101,344 | Reynolds | Dec. 7, 1937 |
| 2,172,831 | Carlson | Sept. 12, 1939 |
| 2,233,181 | Quartullo | Feb. 25, 1941 |
| 2,489,670 | Powell, Jr. | Nov. 29, 1949 |